(12) United States Patent
Scholte et al.

(10) Patent No.: US 8,169,901 B1
(45) Date of Patent: May 1, 2012

(54) METHOD AND APPARATUS FOR CONTROLLING ACCESS TO A MEDIA PORT

(75) Inventors: Alexander Martin Scholte, Chatswood (AU); Luke A. Tucker, Beacon Hill (AU)

(73) Assignee: Avaya Inc., Basking Ridge, NJ (US)

( * ) Notice: Subject to any disclaimer, the term of this patent is extended or adjusted under 35 U.S.C. 154(b) by 2394 days.

(21) Appl. No.: 10/839,539

(22) Filed: May 4, 2004

Related U.S. Application Data

(60) Provisional application No. 60/558,473, filed on Mar. 31, 2004.

(51) Int. Cl.
*G01R 31/08* (2006.01)
(52) U.S. Cl. ..................................... 370/230.1
(58) Field of Classification Search .......... 370/229, 370/230, 230.1, 237, 235, 389, 252
See application file for complete search history.

(56) References Cited

U.S. PATENT DOCUMENTS

| | | | | |
|---|---|---|---|---|
| 6,438,141 B1 * | 8/2002 | Hanko et al. | ................. | 370/477 |
| 6,553,515 B1 * | 4/2003 | Gross et al. | ..................... | 714/47 |
| 6,724,721 B1 * | 4/2004 | Cheriton | ...................... | 370/229 |
| 6,894,974 B1 * | 5/2005 | Aweva et al. | ............. | 370/230.1 |
| 7,027,393 B1 * | 4/2006 | Cheriton | ................... | 370/230.1 |
| 7,467,223 B2 * | 12/2008 | Wu et al. | ........................ | 709/238 |
| 7,698,454 B1 * | 4/2010 | Dyckerhoff et al. | .......... | 709/238 |
| 2002/0087720 A1 * | 7/2002 | Davis et al. | ................... | 709/238 |
| 2002/0114316 A1 * | 8/2002 | Buchanan, Jr. | ............... | 370/350 |
| 2003/0076848 A1 * | 4/2003 | Bremler-Barr et al. | ....... | 370/412 |
| 2003/0223369 A1 * | 12/2003 | Anderson | ..................... | 370/235 |
| 2005/0083845 A1 * | 4/2005 | Compton et al. | ............. | 370/235 |
| 2005/0108551 A1 * | 5/2005 | Toomey | ........................ | 713/185 |

OTHER PUBLICATIONS

Davis, Kevin, Traffic Shapers Ease WAN Congestion, NetworkWorldFusion, Apr. 22, 2002, Network World, Southborough, MA, available at www.nwfusion.com/news/tech/2002/0422tech.html.

* cited by examiner

*Primary Examiner* — Kwang B Yao
*Assistant Examiner* — Anh Ngoc Nguyen
(74) *Attorney, Agent, or Firm* — Sheridan Ross P.C.

(57) ABSTRACT

The present invention is directed to protecting media packet processors from rogue or malicious data packet flows. According to the present invention, feedback obtained from components of a media packet processor having information regarding media stream flows is used to adjust a counter or token bucket controlling the admission of such flows. More specifically, feedback is used to adjust a counter value such that the count value is decremented, or the operation of the counter in incrementing the count value according to a periodic schedule is suppressed, if a dropped packet is detected. Accordingly, the present invention may utilize the predictable quality of media stream flows, and information from components such as jitter buffers and CODECs, in order to tailor bounds on the flow of ingress traffic to a media packet processor.

27 Claims, 4 Drawing Sheets

METHOD AND APPARATUS FOR CONTROLLING ACCESS TO A MEDIA PORT

CROSS-REFERENCE TO RELATED APPLICATION

This application claims the benefit of U.S. Provisional Application No. 60/558,473, filed Mar. 31, 2004, the entire disclosure of which is hereby incorporated herein by reference.

FIELD OF THE INVENTION

The present invention is directed to controlling access to open channel media ports. In particular, the present invention is directed to a mechanism for controlling access to an open media port that receives feedback regarding the state of a data flow.

BACKGROUND OF THE INVENTION

Media packet processors such as voice over Internet protocol (VoIP) gateways, T.38 fax gateways and VoIP conference bridges are vulnerable to denial of service attacks on user datagram protocol (UDP) ports open for active channels. In particular, since these ports are "open," packets arriving on them are accepted, even if they are not actually part of an authorized media stream. Accordingly, rogue or malicious data packets can affect resources common to all open channels associated with a media packet processor, even if the rogue or malicious packets are received on only one of the open channels. As a result, the common resources, for example network interface buffers, bus bandwidth for access to another resource, or processing resources associated with a digital signal processor (DSP) farm can become partially or entirely consumed by the rogue or malicious data packet flow. Rogue flow may include data packets produced by a malfunctioning device, such as an insane VoIP endpoint. An example of a malicious data packet flow is a denial of service attack against a network resource.

In order to prevent a burst of traffic at a port from overwhelming associated resources, traffic shaping schemes have been developed. In particular, such schemes attempt to control the rate at which data packets arrive at a port. Traffic shaping can be implemented through a leaky bucket arrangement, in which data packets are collected in a buffer and then metered out to the data port periodically. When the buffer is entirely full, any additional data packets arriving at the port will be lost. In addition, the leaky-bucket type arrangement has no provision for adjusting the rate at which data packets are allowed to pass to the port.

Another type of traffic shaping mechanism is the token bucket mechanism. According to a token bucket scheme, the bucket is filled with tokens at a predetermined rate. The maximum number of tokens that can be contained by the bucket at an instant in time defines the burst size. As data packets arrive at a port, a queue regulator requests a token for the packet. If a token is available, the data packet is allowed to pass through the port. If a token is not available, the data packet may be queued at the interface between the port and the communication network over which the data packet arrived.

Both the leaky bucket and token bucket mechanisms for controlling access to a data port can function to control the rate at which data packets are passed through a data port to resources. However, such mechanisms are not capable of adjusting their operation in order to account for observable changes in a data packet stream.

SUMMARY OF THE INVENTION

The present invention is directed to solving these and other problems and disadvantages of the prior art. According to the present invention, a method and apparatus for controlling a flow of data packets to a data packet port are provided. In one aspect of the invention, feedback regarding the state of an incoming stream of data packets is provided to adjust parameters of the flow control arrangement. Accordingly, flow control can be adapted to observed conditions in a data packet stream, allowing the flow control parameters to better protect an associated data port.

In accordance with an embodiment of the present invention, a packet token bucket is provided. The packet token bucket may be implemented as a counter. In general, the counter is initialized at a count value of one. The counter is then incremented periodically. For example, in connection with a data packet stream provided according to a protocol that delivers data packets at a regular interval, the counter may be incremented periodically according to that interval. As data packets arrive at the data port, the counter is decremented. If the counter value is equal to zero when a data packet arrives, that data packet is rejected. In addition to being decremented upon the arrival of the data packet, the count value of the counter can be decremented upon the detection of a dropped packet. As used herein, a dropped packet may include a data packet that has been lost in transmission, a data packet that would otherwise appear within a data stream but has not been sent to due to the operation of silence suppression, or a data packet that was otherwise expected to arrive at the data port but for some reason did not arrive.

In accordance with an embodiment of the present invention, the flow control provided may be implemented as part of a media packet processor connected to a communication network. In general, the media packet processor may provide data ports or channels through which one or more resources may be accessed. The media packet processor may additionally provide a media stack or module used in connection with data packet flow control operations. In particular, the media module may detect dropped packets. For example, the media module may detect the non-arrival of an expected data packet, at least within a established time window. Accordingly, the media module may implement a jitter buffer or CODEC. Another example of how dropped packets may be detected is through the operation of silence suppression.

In accordance with another embodiment of the present invention, authentication of data packets may be performed. For instance, data packets allowed to pass through the data port are then authenticated, to verify that the source of the data packet is valid. If the data packet is properly authenticated, it is then passed to a resource.

DETAILED DESCRIPTION

Figure 1:
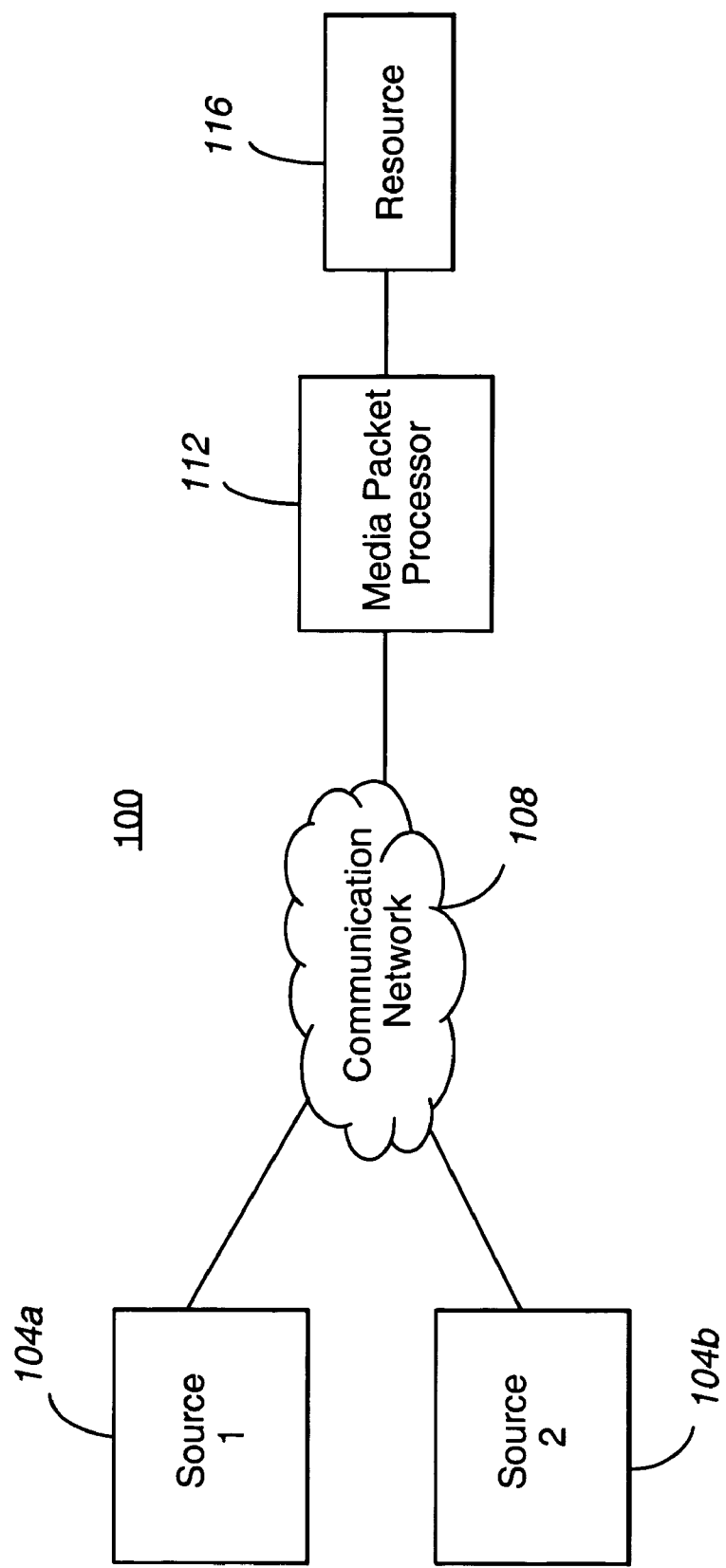
FIG. 1 is a schematic diagram of a communication arrangement in accordance with an embodiment of the present invention.

With reference now to FIG. 1, a communication arrangement 100 in accordance with an embodiment of the present invention is schematically depicted. In general, the communication arrangement includes any number of sources 104. For example, as shown in FIG. 1 first 104a and second 104b sources may be provided. In general, the sources 104 originate data packets. Accordingly, sources 104 may include communication endpoints, such as IP telephones, soft IP telephones, media terminals, or other sources of data. In addition, sources 104 may include gateways at the interface between an IP and non-IP network.

The communication arrangement 100 additionally includes a communication network 108. In general, the communication network 108 comprises an Internet protocol (IP) communication network. Accordingly, the communication network 108 is adapted to transmitting data packets.

A communication arrangement 100 in accordance with embodiments of the present invention additionally includes a media packet processor 112. The media packet processor 112 is capable of accepting packets provided from a source 104 and transmitted across a communication network 108. In general, the media packet processor 112 provides one or more data ports, capable of supporting communication channels established over the communication network 108 between the media packet processor 112 and one or more of the sources 104.

The communication arrangement 100 may additionally include one or more resources 116. In general, the provided resource 116 is accessible to a source 104 via the communication network 108 and the media packet processor 112. For example, the resource 116 may be considered a data or data packet sink. Examples of a resource 116 include digital signal processor (DSP) farms capable of performing various tasks and operations, media servers and mass storage devices.

As will be described in greater detail elsewhere herein, a media packet processor 112 in accordance with the present invention provides a flow control arrangement to protect the resource 116 from being overwhelmed by malicious data flows, such as may be sent to a data port or ports as part of a denial of service attack, or from data packets sent at an abnormally high rate by a misbehaving source 104. As part of the operation of embodiments of the present invention, and as will be described in greater detail elsewhere herein, feedback regarding the status of packets in a normal, authorized data stream, is used to help regulate access to resources through a port. In particular, if an expected packet has been dropped from a data packet flow (i.e., a "dropped packet" is detected), the counter implementing the token bucket is decremented. This use of feedback regarding data packet flow prevents tokens created for expected but dropped packets from being used by malicious or errant packets to access the associated port and an associated resource or resources.

Figure 2:
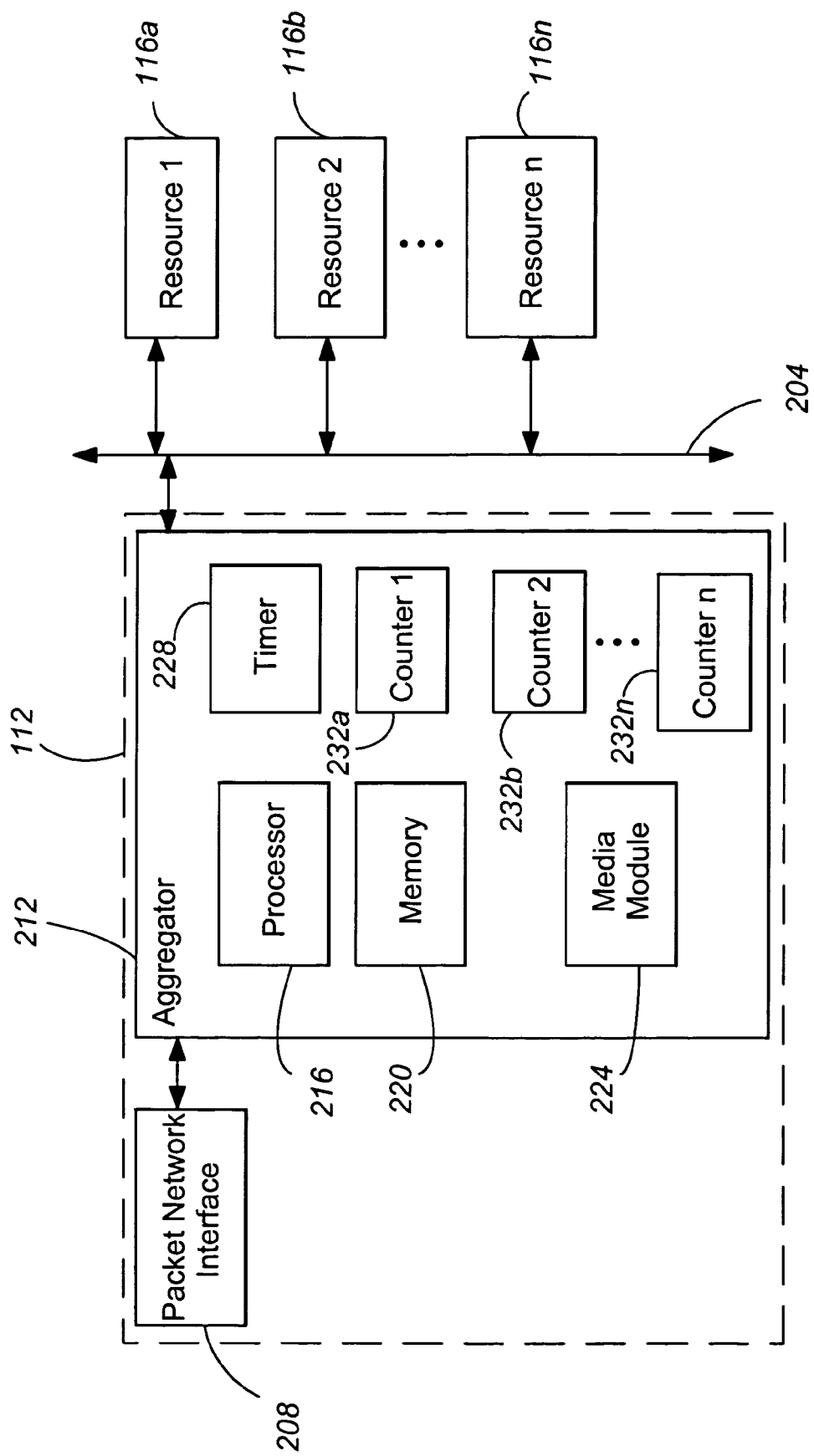
FIG. 2 is a schematic depiction of a media packet processor and associated resources in accordance with an embodiment of the present invention.

With reference now to FIG. 2, additional aspects of a media packet processor 112 in accordance with an embodiment of the present invention, and its relationship to associated resources 116, is illustrated. Also shown in FIG. 2 is a communication bus 204 interconnecting the media packet processor 112 to a plurality of resources 116a-n. In general, the media packet processor 112 includes a packet network interface 208 and an aggregator 212. The packet network interface provides an interface between the media packet processor 112 and the communication network 108. Accordingly, the packet network interface may comprise an Ethernet interface, ATM interface or other packet network interface. Accordingly, the packet network interface 208 provides the physical interconnection required to provide one or more ports, such as user datagram protocol ports capable of supporting a packet data channel established across the communication network 108.

The aggregator 212 generally includes a processor 216, memory 220, a media module or stack 224, a timer 228, and one or more counters 232a-n. The processor 216 may include any general purpose processor 216 capable of running code implementing the flow control functions of the media packet processor 112. Alternatively, the processor 216 may comprise a specially configured application specific integrated circuit (ASIC) or controller. The memory 220 may provide storage space for programming instructions implementing the functions of the media packet processor 112 that can be executed by the processor 216. Alternatively or in addition, the memory 220 may provide storage space in which various functional aspects of the media packet processor 112 are implemented, including the media module 224, timer 228, and counters 232.

The media module 224 generally provides conventional media channel controls. Accordingly, the media module 224 may implement a voice over Internet protocol (VoIP) media stack, with a CODEC or a variable bit rate CODEC.

The timer 228 may comprise a conventional timer or clock. Accordingly, the timer 228 may be implemented in connection with programming code executed by the processor 216. The timer 228 may alternatively comprise a clock or timer implemented as an integrated circuit or other dedicated device.

In general, a counter 232 may be provided for each port of the media packet processor 112 for which the flow control is to be provided. Typically, a counter 232 is therefore provided for each port provided by the media packet processor 112. The counters 232 may be implemented as programming code executed by the processor 216. Alternatively, the counters 232 may be implemented as integrated circuits or other dedicated circuit elements. In general, the counters 232 may be incremented according to a periodic signal received or derived from the timer 228. In addition, the counters 232 are capable of being decremented, or of having an incrementing step suppressed, in response to feedback generated by and/or received from the media module 224.

The communication bus 204 interconnects the media packet processor 112 to the resource or resources 116. Accordingly, data packets allowed to pass by the media packet processor 112 are delivered to an appropriate resource 116 by the communication bus 204.

Figure 3:
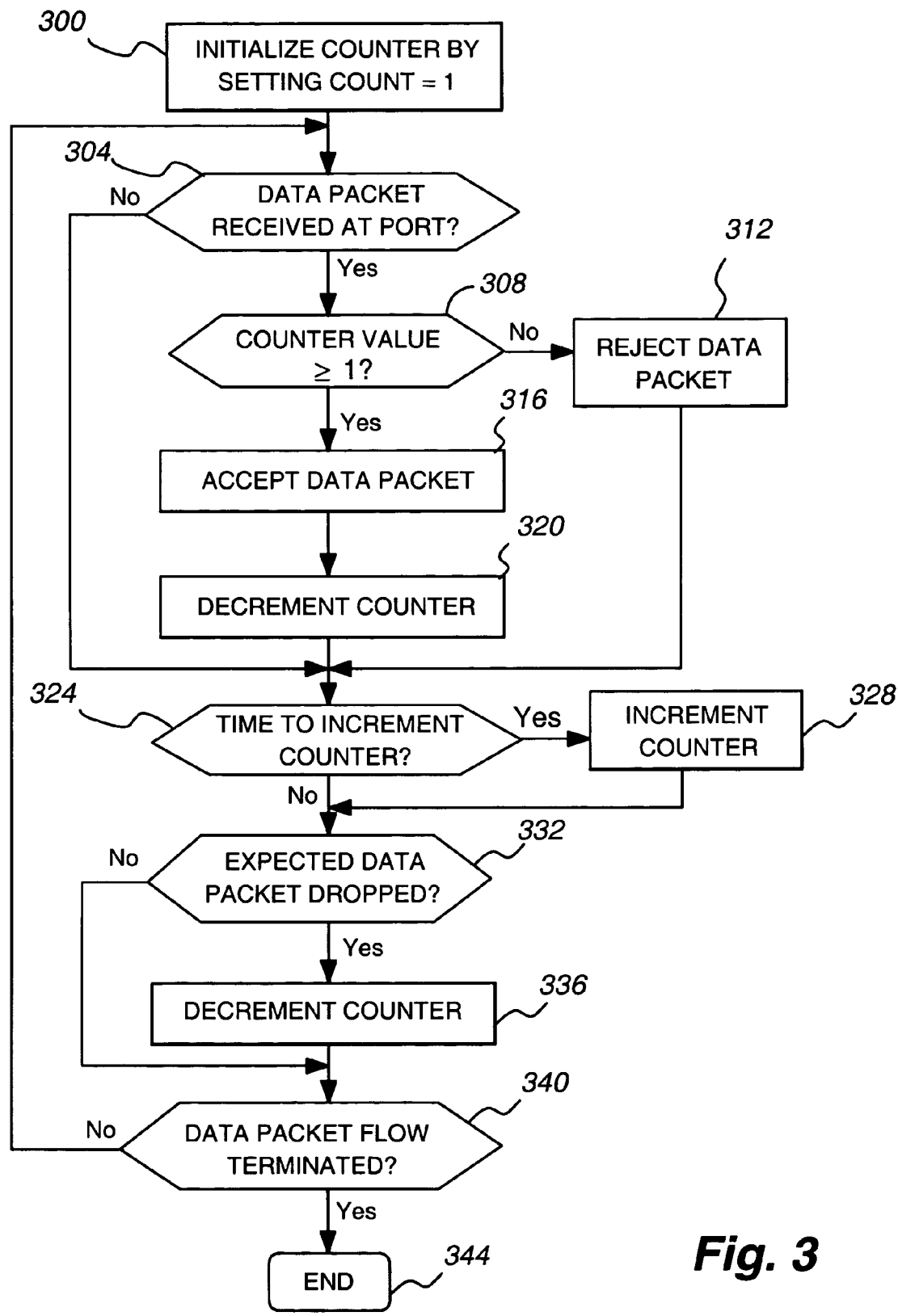
FIG. 3 is a flowchart illustrating the operation of an embodiment of the present invention.

With reference now to FIG. 3, the operation of a media packet processor 112 in accordance with an embodiment of the present invention is illustrated. In particular, FIG. 3 illustrates the operation of a media packet processor 112 that is capable of monitoring data packet flow control information, and decrementing a counter associated with a particular data packet flow when a dropped data packet is detected.

Initially, at step 300, the counter 232 associated with a data packet flow is initialized by setting the count value equal to one. At step 304 a determination is made as to whether a data packet has been received at the port. If a data packet has been received, a determination is next made as to whether the value held by the counter 232 is greater than or equal to one (step 308). If the counter value is not greater than or equal to one, the data packet is rejected (step 312). If the counter value is greater than or equal to one, the data packet is accepted (step 316), and the counter 232 is decremented (step 320). In accordance with an embodiment of the present invention, the minimum value that can be held by a counter 232 is zero.

If at step 304 it is determined that a data packet has not been received at the port, a determination is next made as to whether it is time to increment the counter 232 (step 324). The determination as to whether it is time to increment the counter is also made after a step of decrementing the counter (step 320) or rejecting a data packet (step 312). If it is determined that it is time to increment the counter, the counter is incremented at step 328.

After incrementing the counter, or after determining that it is not time to increment the counter, a determination is made as to whether an expected data packet has been dropped (step 332). As can be appreciated by one of skill in the art, various mechanisms, for example implemented by a media module 224 within a media packet processor 112, may provide an indication that an expected data packet has been dropped. For example, a jitter buffer implemented by the media module 224 can detect the non-arrival of a data packet scheduled to arrive as part of a data packet stream. As can further be appreciated, such non-arrival may comprise an expected data packet that does not arrive within a predetermined window of time. As a further example, a dropped packet may, for purposes of the present description, comprise a data packet that is not sent or transmitted due to the operation of silence suppression. As still another example, a variable bit rate CODEC implemented by the media module 224 may indicate the absence of a data packet due to the use of less than maximal data transmission rates, and thus indicate a dropped packet for purposes of the present description. Thus, it can be appreciated that any information or indication that a data packet that was expected to arrive at a data port has been lost or has not been sent is feedback that can be used to decrement the counter 232. Furthermore, where the feedback mechanism indicates that more than one data packet has been dropped, the counter 232 may be decremented by an amount corresponding to the number of dropped data packets.

As can be appreciated by one of skill in the art in view of the description provided herein, by decrementing the counter in response to the detection of dropped packets, access to a protected port can be more closely controlled. In particular, by decrementing the counter in response to dropped packets, the value of the counter is prevented from becoming inflated due to the passage of time and due to the non-arrival of packets that had been expected as part of a data packet flow. Therefore, count values that might otherwise allow malicious or errant packets to access a port are prevented from becoming very large.

After decrementing the counter at step 336, or after determining that an expected data packet has not been dropped at step 332, a determination is made as to whether the data packet flow to the port has been terminated (step 340). If the data packet flow has not been terminated, and thus additional packets are expected, the process returns to step 304. If the data packet flow has been terminated, the process ends (step 344).

Figure 4:
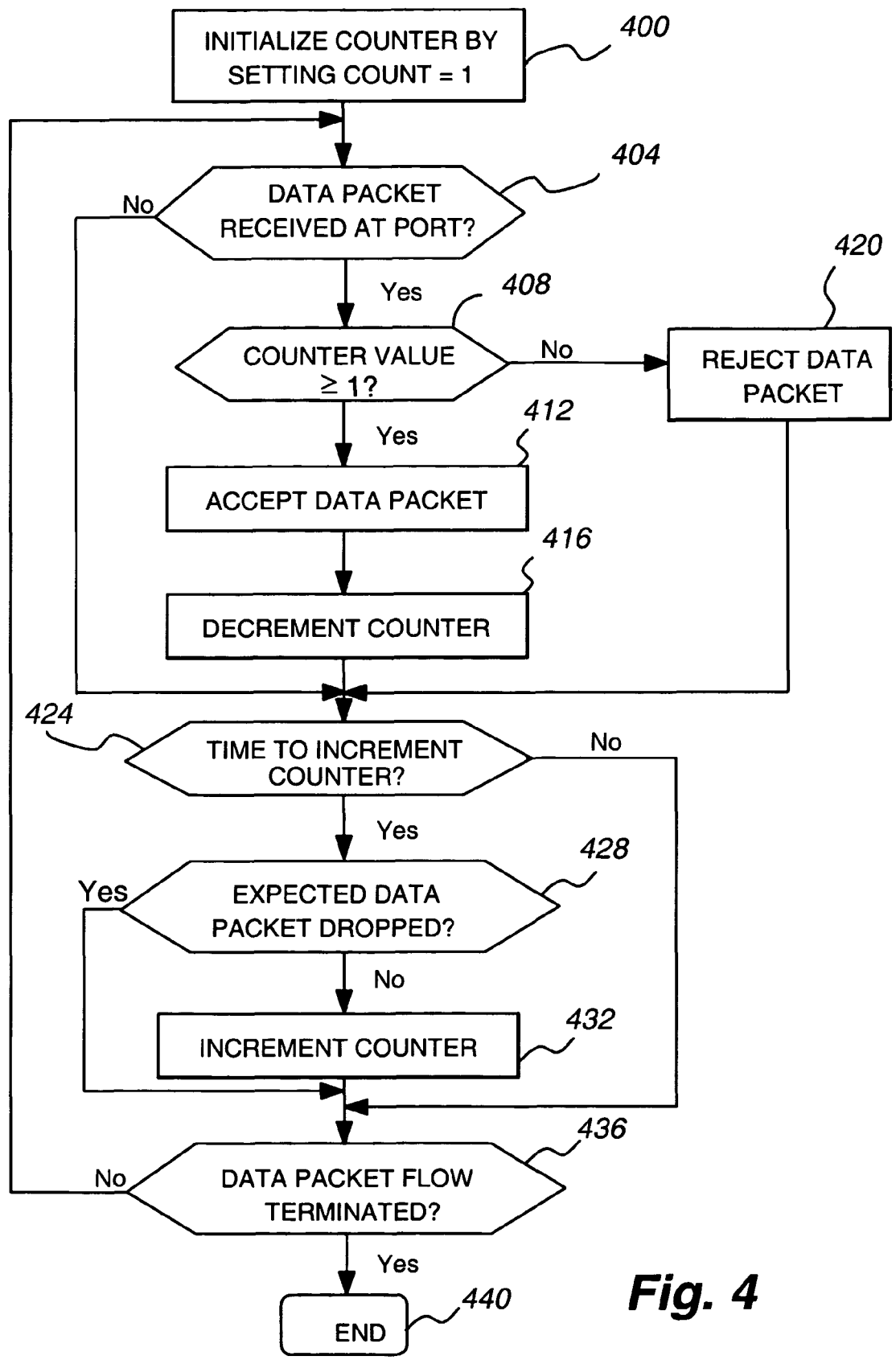
FIG. 4 is a flowchart illustrating the operation of another embodiment of the present invention.

With reference now to FIG. 4, the operation of a media packet processor 112 in controlling data packet flow to or through a data port is illustrated in accordance with another embodiment of the present invention. Initially, at step 400, a counter 232 associated with a data port is initialized by setting the count value equal to one. A determination is then made as to whether a data packet has been received at the data port (step 404). If a data packet has been received, a determination is next made as to whether the value held by the counter 232 is greater than or equal to one (step 408). If the counter value is greater than or equal to one, the data packet is accepted (step 412), and the counter 232 is decremented (step 416). If at step 408 it is determined that the counter value is not greater than or equal to one, the data packet is rejected (step 420).

After a determination that a data packet has not been received at the port (step 404), after decrementing the counter (step 416), or after rejecting a data packet (step 420), a determination is made as to whether it is time to increment the counter 232 (step 424). As noted elsewhere herein, the time to increment the counter 232 may be determined by making reference to the operation of a timer 228. If it is determined that it is time to increment the counter, a determination is made as to whether an expected data packet has been dropped (step 428). If it has been determined that an expected data packet has not been dropped, the counter 232 is incremented (step 432). However, if it is determined that an expected packet has been dropped, the process continues to the next step (step 436) without incrementing the counter. Accordingly, a media packet processor 112 operating in according with the embodiment illustrated in FIG. 4 suppresses the operation of the counter 232 when a dropped packet has been detected.

At step 436, a determination is made as to whether the data packet flow has been terminated. If the data packet has not been terminated, the process returns to step 404. If the data packet flow has been terminated, the process ends (step 440).

As can be appreciated from the description provided herein, the present invention implements a flow control mechanism that utilizes feedback from components of a media packet processor 112 in order to adjust flow control parameters. In particular, where a dropped packet is detected, a token or count value added to a counter or token bucket in the normal course (e.g., after an amount of time corresponding to the arrival rate of packets within a packet flow) may be removed from the counter or bucket. Alternatively, a step of incrementing a counter or adding a token to a bucket can be suppressed in response to detecting a dropped packet.

Although the description provided herein has described examples according to which one count value or token corresponds to one packet, the invention is not so limited. For example, in connection with protocols allowing for packets of varying length, different length packets may result in decrementing the counter by values other than one. In addition, it should be appreciated that the initial value held by a counter 232 need not be one. In particular, a counter 232 may be initialized at any value greater than zero.

Furthermore, although the description provided herein has described examples according to which code or software implementing the flow control functions of the media packet processor 112 run on the processor 216 of the aggregator 212, embodiments of the present invention are not so limited. For example, software implementing the flow control functions may run on processors depicted by or associated with one or more resources 116.

The present invention may be applied in connection with any data packet stream for which information regarding the data packet flow is available at a receiving endpoint or network node. Accordingly, the present invention may be applied to TCP/IP data streams established in accordance with various protocols, such as the G.711, H.323, or any other protocols where a determination can be made by the receiver on expected packet arrival from the current state, for use in connection with establishing a channel across a data packet network for transmitting data, including real-time transfer protocols. Thus, examples of media packet processors 112 include VoIP gateways, T.38 fax gateways, state, VoIP conference bridges, V.MoIP modem gateways, and VoIP multiplexers that provide open user datagram protocol ports for active channels. Furthermore, by providing tighter bounds on ingress traffic, the present invention can protect against service interruptions due to the receipt of rogue or malicious packets. Therefore, the present invention may be used in connection with high reliability applications.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for shaping bounds on ingress traffic to a port of a media packet processor, comprising:
   providing a media packet processor, wherein said media packet processor includes a packet network interface that provides at least one port interconnected to a network;
   providing a packet token bucket as part of said media packet processor;
   adding a token to said packet token bucket at a predetermined interval;
   in response to detecting a dropped packet in connection with a data stream and while said packet token bucket would otherwise receive an additional token, suppressing addition of a token to said packet token bucket; and
   in response to receiving a data packet at said port from said network, removing a token from said packet token bucket.

2. The method of claim 1, further comprising:
   in response to said packet token bucket containing zero tokens, rejecting a data packet at said port.

3. The method of claim 1, wherein said predetermined interval comprises a periodic interval.

4. The method of claim 1, further comprising:
   authenticating a received data packet.

5. The method of claim 4, wherein said authenticating comprises determining a source of said received data packet.

6. The method of claim 1, wherein said detecting a dropped packet comprises receiving an indication from a jitter buffer that a packet has been dropped from said data stream.

7. The method of claim 1, further comprising initializing said packet token bucket with at least a first token.

8. The method of claim 1, wherein said packet token bucket comprises a counter.

9. A method for shaping bounds on ingress traffic to a port of a media packet processor, comprising:
   providing a media packet processor, wherein said media packet processor includes a packet network interface associated with a port interconnected to a network;
   providing a packet token bucket as part of said media packet processor;
   adding a token to said packet token bucket at a predetermined interval;
   in response to detecting a dropped packet in connection with a data stream transmitted over said network, at least one of removing a token from said packet token bucket and suppressing addition of a token to said packet token bucket; and
   in response to receiving a data packet at said port from said network, removing a token from said packet token bucket, wherein said detecting a dropped packet comprises receiving an indication from a jitter buffer implemented by said media packet processor that an expected packet will not arrive due to operation of a silence suppression feature.

10. The method of claim 9, wherein in response to detecting a dropped packet a token is removed from said packet token bucket.

11. The method of claim 9, wherein said predetermined interval comprises a periodic interval.

12. The method of claim 9, wherein in response to detecting a dropped packet the addition of a token to said packet token bucket is suppressed.

13. The method of claim 9, wherein said packet token bucket comprises a counter.

14. A method for shaping bounds on ingress traffic to a port of a media packet processor, comprising:
    providing a media packet processor;
    providing a packet network interface as part of said media packet processor, wherein said packet network interface is interconnected to a network;
    providing a packet token bucket as part of said media packet processor;
    adding a token to said packet token bucket at a predetermined interval;
    in response to detecting a dropped packet in connection with a data stream associated with said packet network interface and said network and while said packet token bucket would otherwise receive and add an additional token to the total number of tokens held in the bucket, suppressing addition of a token to said packet token bucket; and
    in response to receiving a data packet at said port, removing a token from said packet token bucket, wherein said port comprises a UDP port.

15. A media packet processor comprising an aggregator including a processor, a memory, a media stack, a timer, and a counter, for performing a method, the method comprising:
    incrementing said counter implemented as part of an aggregator included in a computational component at predetermined intervals;
    receiving from said media stack implemented as part of an aggregator an indication that an expected packet has not arrived at a port, wherein said expected packet is associated with a data stream over a network interconnected to said port via a packet network interface associated with said aggregator; and
    in response to receiving said indication from said media stack that an expected packet has not arrived at said port, suppressing the incrementation of said counter, wherein absent said suppressing the incrementation of said counter said counter would have been incremented.

16. The method of claim 15, further comprising:
    receiving a data packet at said port; and
    in response to receiving said data packet at said port, decrementing said counter.

17. The method of claim 16, further comprising:
    authenticating said received data packet.

18. The method of claim 16, further comprising:
    providing said received data packet to a packet processor.

19. The method of claim 15, further comprising:
    receiving at said port a data packet;
    authenticating said data packet;
    in response to determining that said data packet is authentic, decrementing said counter; and in response to determining that said data packet is not authentic, rejecting said data packet.

20. The method of claim 15, wherein said media stack comprises a jitter buffer.

21. The method of claim 15, further comprising:
initializing said counter with a count of one.

22. The method of claim 15, further comprising:
receiving a data packet; and
in response to said counter having a count of zero, rejecting said data packet.

23. The method of claim 15, wherein said computational component comprises a logic circuit.

24. The method of claim 15, wherein said media stack provides an indication that an expected packet has not arrived at a port due to operation of a silence suppression feature.

25. An apparatus for controlling access to a channel, comprising:
means for maintaining a token count;
means for incrementing said token count;
means for detecting a dropped packet; and
means for decrementing said token count in response to said detection of a dropped packet, wherein said dropped packet is a packet that is not delivered due to the operation of a silence suppression scheme.

26. The apparatus of claim 25, wherein said means for incrementing a token count increments said token count according to a predetermined schedule.

27. The apparatus of claim 26, wherein said predetermined schedule comprises a periodic schedule.

* * * * *